US008990107B2

(12) United States Patent
Liang et al.

(10) Patent No.: US 8,990,107 B2
(45) Date of Patent: Mar. 24, 2015

(54) DETERMINING USER STAYS OF A USER OF A MOBILE DEVICE

(71) Applicants: Sam Song Liang, Palo Alto, CA (US); Huan Chang, Menlo Park, CA (US); Jun Yang, Milpitas, CA (US); Zhigang Liu, Sunnyvale, CA (US); Yun Fu, Cupertino, CA (US); Chenyu Wang, Mountain View, CA (US); Ying Chang, Stanford, CA (US)

(72) Inventors: Sam Song Liang, Palo Alto, CA (US); Huan Chang, Menlo Park, CA (US); Jun Yang, Milpitas, CA (US); Zhigang Liu, Sunnyvale, CA (US); Yun Fu, Cupertino, CA (US); Chenyu Wang, Mountain View, CA (US); Ying Chang, Stanford, CA (US)

(73) Assignee: Alohar Mobile Inc., Palo Alto, CA (US)

( * ) Notice: Subject to any disclaimer, the term of this patent is extended or adjusted under 35 U.S.C. 154(b) by 39 days.

(21) Appl. No.: 13/896,726

(22) Filed: May 17, 2013

(65) Prior Publication Data
US 2013/0252633 A1 Sep. 26, 2013

Related U.S. Application Data

(63) Continuation-in-part of application No. 13/278,396, filed on Oct. 21, 2011, now Pat. No. 8,725,569.

(60) Provisional application No. 61/649,260, filed on May 19, 2012.

(51) Int. Cl.
*G06Q 30/00* (2012.01)
*H04W 4/02* (2009.01)
(Continued)

(52) U.S. Cl.
CPC ............. *H04W 4/02* (2013.01); *G06Q 30/0251* (2013.01); *G06Q 30/0261* (2013.01); *G06Q 30/0269* (2013.01); *H04W 52/0251* (2013.01); *H04W 4/023* (2013.01)
USPC .................... 705/14.66; 705/14.58; 705/14.49

(58) Field of Classification Search
CPC ............................................... G06Q 30/0269
USPC ....................................................... 705/14.66
See application file for complete search history.

(56) References Cited

U.S. PATENT DOCUMENTS 4,495,581 A * 1/1985 Piccione ........................ 705/402
5,797,134 A * 8/1998 McMillan et al. ............. 705/400
(Continued)

FOREIGN PATENT DOCUMENTS

KR 10-2008-0119603 6/2010

OTHER PUBLICATIONS

Using GPS to Learn Significant Locations and Predict Movement Across Multiple Users; Daniel Ashbrook and Thad Starner, College of Computing, Georgia Institute of Technology.
(Continued)

*Primary Examiner* — John G Weiss
*Assistant Examiner* — Scott C Anderson
(74) *Attorney, Agent, or Firm* — Brian R. Short

(57) ABSTRACT

Methods, systems and apparatuses for automatically determining user stays of a user of a mobile device are disclosed. One embodiment includes a network server operative to receive sensed location information of a mobile device. Further, the network server and/or a controller of the mobile device are operative to determine the mobile device is within a specific distance of a specific location for at least specific minimum time duration based on the location information, determine a start time of a user stay based on the location information, the specific location and the specific distance, and determine an end time of the user stay based on the location information, the specific location and the specific distance.

22 Claims, 7 Drawing Sheets

(51) Int. Cl.
*H04W 52/02* (2009.01)
*G06Q 30/02* (2012.01)

(56) References Cited

U.S. PATENT DOCUMENTS

| | | | |
|---|---|---|---|
| 6,917,940 B1 | 7/2005 | Chen et al. | |
| 6,975,873 B1 | 12/2005 | Banks et al. | |
| 7,254,388 B2* | 8/2007 | Nam et al. | 455/418 |
| 7,321,305 B2* | 1/2008 | Gollu | 340/572.1 |
| 7,483,946 B2 | 1/2009 | Boyd | |
| 2002/0111172 A1 | 8/2002 | DeWolf et al. | |
| 2003/0040946 A1 | 2/2003 | Sprenger et al. | |
| 2003/0176931 A1 | 9/2003 | Pednault et al. | |
| 2006/0190371 A1* | 8/2006 | Almgren et al. | 705/35 |
| 2007/0064263 A1* | 3/2007 | Silverbrook et al. | 358/1.15 |
| 2007/0219706 A1 | 9/2007 | Sheynblat | |
| 2008/0214210 A1 | 9/2008 | Rasenen et al. | |
| 2008/0215557 A1 | 9/2008 | Ramer et al. | |
| 2009/0089131 A1* | 4/2009 | Moukas et al. | 705/8 |
| 2009/0150067 A1* | 6/2009 | Lindman | 701/204 |
| 2009/0177384 A1 | 7/2009 | Walder | |
| 2010/0041378 A1 | 2/2010 | Aceves et al. | |
| 2010/0073201 A1 | 3/2010 | Holcomb et al. | |
| 2010/0125406 A1 | 5/2010 | Prehofer | |
| 2010/0229190 A1 | 9/2010 | Koo et al. | |
| 2010/0250136 A1 | 9/2010 | Chen | |
| 2011/0143777 A1 | 6/2011 | Kim et al. | |
| 2011/0161427 A1 | 6/2011 | Fortin et al. | |
| 2011/0181517 A1 | 7/2011 | Orr et al. | |
| 2011/0184640 A1 | 7/2011 | Coleman et al. | |
| 2011/0238289 A1 | 9/2011 | Lehmann et al. | |
| 2011/0239158 A1 | 9/2011 | Barraclough et al. | |
| 2011/0313649 A1 | 12/2011 | Bales et al. | |

OTHER PUBLICATIONS

Mining Personally Important Places from GPS Tracks; Changqing Zhou, Nupur Bhatnagar, Shashi Shekhar, Loren Terveen, Department of Computer Science and Engineering, University of Minnesota.

Extracting Places and Activities from GPS Traces Using Hierarchical Conditional Random Fields, Lin Liao Dieter Fox Henry Kautz, Department of Computer Science & Engineering University of Washington.

Mining Significant Semantic Locations From GPS Data, Xin Cao† Gao Cong† Christian S. Jensen, School of Computer Engineering, Nanyang Technological University, Singapore.

Mining GPS Data for Extracting Significant Places, G. Agamennoni, J. Nieto, E. Nebot, Australian Center for Field Robotics, University of Sydney, Australia.

Learning Significant User Locations with GPS and GSM, Department of Electrical Engineering and Computer Science, Massachusetts Institute of Technology, Sep. 2006.

* cited by examiner

DETERMINING USER STAYS OF A USER OF A MOBILE DEVICE

RELATED APPLICATIONS

This patent application claims priority to U.S. Provisional Patent Application No. 61/649,260, filed May 19, 2012, and is a continuation-in-part of U.S. patent application Ser. No. 13/278,396, titled "Location Based User Behavior Analysis and Applications", filed Oct. 21, 2011, which claims priority to U.S. Provisional Patent Application No. 61/406,198, filed Oct. 25, 2010, which are herein all incorporated by reference.

FIELD OF THE DESCRIBED EMBODIMENTS

The described embodiments relate generally to location-based services. More particularly, the described embodiments relate to methods, systems and apparatuses for determining user stays of a user of a mobile device.

BACKGROUND

There is an increasing need to automatically monitor a mobile device user's location and other behavior, understand the user's habits and interests, and provide intelligent personal assistance to the user based on the user's habits and interests obtained through location based behavior analysis. Presently, location based services include manual check-ins. For a manual check-in, the user opens an application on their mobile device manually, and indicates that they are at a specific business.

In the area of location-based services, a check-in represents a single visit by a user to a location or place on the earth. One of the main problems with checking in is check-in fatigue. The fact that most popular social networks require users to manually enter their location makes them pretty tedious considering there is often little to no reward. FourSquare, Facebook or Google Latitude have developed check-in technology based on geo-fencing and background location monitoring that can trigger some interesting applications by getting close. However, this type of solution is not generative, which require users to input his favorite places into the system in advance. It cannot be applied to a new place that is not in the scope of existing places database of the user.

Additionally, location-based searches are manual. That is, the user conducts a search of some business using keyword, such as "restaurant", and the application returns results that are the closest to the user's current location.

Other location-based service includes mobile social applications wherein, for example, friends are shown on a map. However, that services and applications are limited because they can't accurately determine the point of the interest the user is at, hard to disambiguate between multiple points of interest near each other. Generally, current local business or POI search is only using the spatial data as input, which does not generally provide enough information to accurately determine the point of interest.

It is desirable to have a method, apparatus and system for determining user stays of a user of a mobile device.

SUMMARY

An embodiment includes a method of automatically determining user stays of a user of a mobile device. The method includes sensing location information by the mobile device, wherein the location information includes a plurality of components, determining the mobile device is within a specific distance of a specific location for at least specific minimum time duration based on the location information, determining a start time of a user stay based on the location information, the specific location and the specific distance, and determining an end time of the user stay based on the location information, the specific location and the specific distance.

Another embodiment includes a mobile device. The mobile device includes a location sensor operative to sense location information of the mobile device, a transceiver operative to establish a communication link with a network server, and a controller. At least one of the controller or the network server are operative to determine the mobile device is within a specific distance of a specific location for at least specific minimum time duration based on the location information, determine a start time of a user stay based on the location information, the specific location and the specific distance, and determine an end time of the user stay based on the location information, the specific location and the specific distance.

Another embodiment includes a network server operative to receive sensed location information of a mobile device. Further, the network server and/or a controller of the mobile device are operative to determine the mobile device is within a specific distance of a specific location for at least specific minimum time duration based on the location information, determine a start time of a user stay based on the location information, the specific location and the specific distance, and determine an end time of the user stay based on the location information, the specific location and the specific distance.

Other aspects and advantages of the described embodiments will become apparent from the following detailed description, taken in conjunction with the accompanying drawings, illustrating by way of example the principles of the described embodiments.

DETAILED DESCRIPTION

Figure 1:
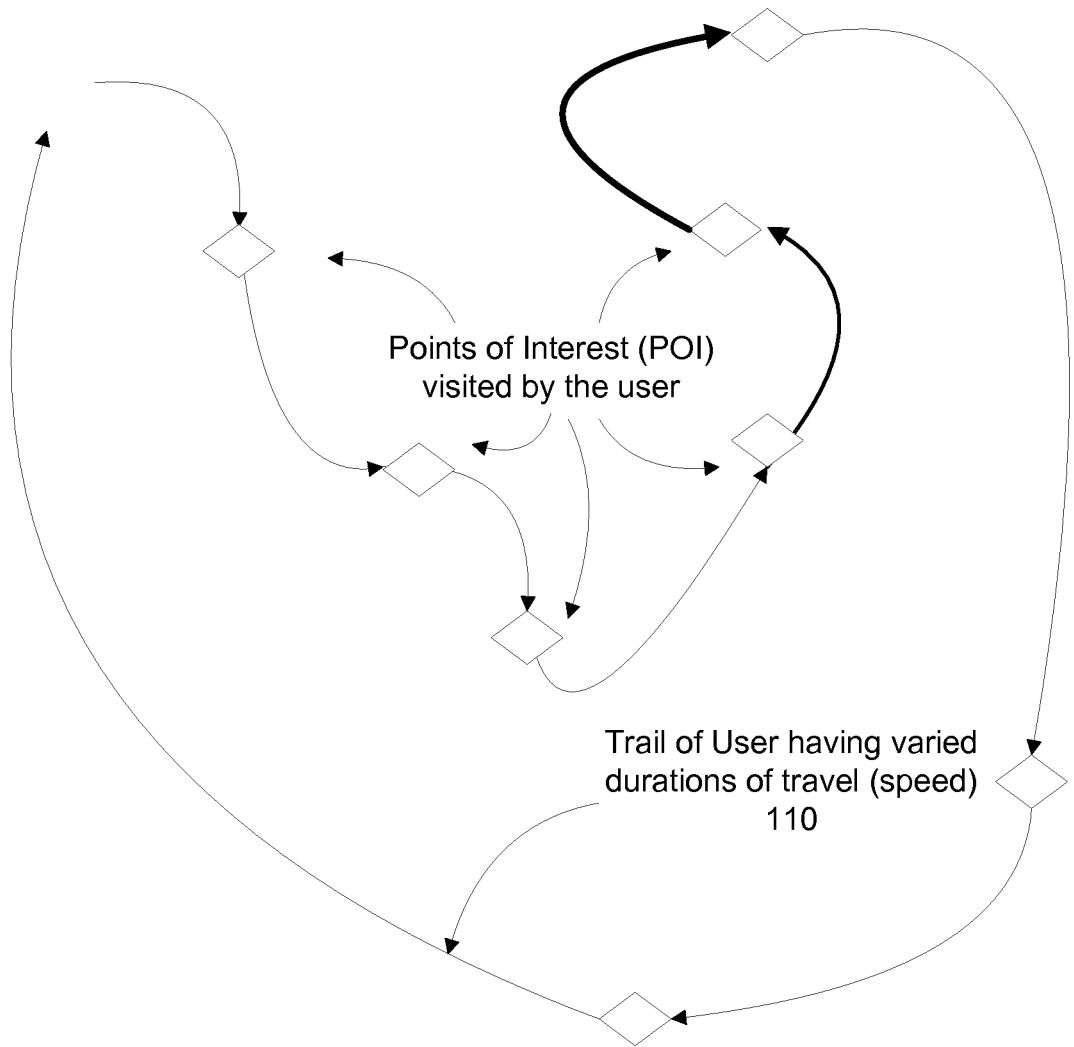
FIG. 1 shows an example of a map that depicts locations traveled by an individual that further depicts points of interest of the user.

The described embodiments include methods, systems and apparatuses for determining user stays of a user of a mobile device. At least some of the described embodiments include sensing location information by the mobile device, wherein the location information includes a plurality of components, determining the mobile device is within a specific distance of a specific location for at least specific minimum time duration based on the location information, determining a start time of a user stay based on the location information and the specific distance, and determining an end time of the user stay based on the location information and the specific distance.

Some existing systems require and leverage a user input. Such systems give a user an incentive to register a place name on their mobile software every time the user enters a place of interest or significance. That is, the existing systems are relatively primitive and require a user input specifying the time when the user stayed at a place or what that place is, or both. In contrast, the described embodiments do not require a user input and, for the most part, automatically detect the fact that the user stayed proximate to a location (for at least some embodiments, the coupling proximity, time and place is referred to as a "user stay"). That is, at least some embodiments include determining a user stay without real-time input by the user of the mobile device. That is, any user inputs are displaced from the time and place at which the user stay is being determined, or the time and place at which the user inputs are received do not influence the user stay determination.

For at least some embodiments, a user stay of a user of the mobile device is defined by the mobile device being within the specific distance (which for at least some embodiments, is determined by a threshold physical distance) of a location for at least the specific minimal duration (which can also be defined by a threshold period of time). As described, the location of the mobile device changes over time, and the specific location changes over time as the locations of the mobile changes. The location of the mobile device is tracked over time. A distance of the mobile device can be defined by the distance of each location point (such as, GPS data point) associated with the mobile device to a location, such as, the specific location. The minimal time duration can be defined by the amount of time the mobile device is within the specific distance (or threshold distance) from the specific location.

As previously stated, for at least some embodiments, the specific location adaptively changes over time as the mobile device moves. At least some embodiments include determining the specific location by statistically calculating the specific location based on a plurality of locations of the mobile device over a period of time. For an embodiment, the period of time is determined based on the start time and the end time. As will be described, the statistical calculation can include the determination of a centroid.

An embodiment includes associating a Point of Interest (POI) with the specific location, and adaptively determining the specific distance based on the POI. An embodiment includes adaptively determining the specific minimum time duration based on the POI. For an embodiment, at least one of the specific distance or the specific minimum time duration is determined by accessing a look up table based on the POI.

For at least some embodiments, the POI is defined as a specific point location or place that someone may find useful or interesting. There can be at least two types of POIs: public POIs (e.g. stores, parks) that one can obtain from POI database services, and personal POIs (e.g. home, friend's home) that are personal to a mobile user. As described, the specific distance and the specific minimum time duration can adaptively change based on an identified POI associated with the user stay. For example, the specific distance and the specific minimum time duration associated with a physically large POI (such as, a convention hall or sports stadium) can be quite different than the specific distance and the specific minimum time duration associated with physically small POI (such as, a small shop or residence).

A POI can have several properties, such as latitude and longitude, a name (e.g., Olive Garden), a category (for instance, restaurant), and a subcategory (for example, Italian cuisine). A POI can be of different sizes, and can have a hierarchical structure. For example, a POI can be a big park, such as Yosemite. Inside the park, there can be smaller POIs, such as a hotel or a restaurant. Furthermore, a POI can be associated with an event name (for example, a concert of Beatles, or a baseball game in a stadium, a seminar on cooking).

For at least some of the embodiments described, a user stay is defined as an event in which a specific user visits a specific POI at a specific time. For embodiments, each user stay has attributes including reference to the POI, start time of the visit, duration of the visit, and the device (as a proxy of the user) that detects the visit. A user stay can be detected by clustering user location data continuously collected by the mobile device of a user, computing the cluster's centroid, and then matching it to a nearby POI. In addition to its geographical presence, a user stay can include temporal presence, such as events scheduled at the specific POI. For example, the POI like a stadium can have football game on Friday, a concert on Saturday, and a baseball game on Sunday. For at least some embodiments, such an event is defined as an event of interest (EOI), which can be an attribute of a user stay.

For at least some embodiments, the determinations of user stays and the user's points of interest are automatic. That is, user stay and/or POI determination processing is automatically executed without the user proactively or reactively providing input. For some embodiments, the determination of the user's user stays and/or POIs does not require manual input from the user. The processing can be performed in the background, and operate on persistently collected sensor data (optionally uploading the data to a server). For an embodiment, a background-processing algorithm determines the user stay and/or POI. Note, all or portions of the user stay and/or POI determination algorithms can run on both mobile client side (the mobile device) and server side (a server connected to the mobile device through a network). Other embodiments include semi-automatic processing in which a user's input or feedback can optionally be included with the processing to improve the process. For example, user inputs, such as correcting or adding or deleting a user stay and/or POI, can be used as important feedback information to boost the performance of overall user stay and/or POI determination processing.

For some embodiments, the processing is performed (at the mobile device and/or at the server) in real-time, and for some embodiments the processing includes post-processing. For real-time processing, the user stay and/or POI determination is made with a short delay (e.g. 10 seconds or a minute) after the user arrives at the user stay and/or POI, with a determination deadline being adaptively specified depending on the application. For post-processing, the user stay and/or POI determination is made beyond the short delay (or without a deadline).

For at least some embodiments, a current state of a user is defined as the user's current location, time and what the user is doing. Furthermore, the current state can include user stays of that user within a predetermined time window before a present time, wherein the predetermined time window has variable length dependent upon application requirements and the location behavior being observes. For example, the time window of current state can be past few seconds, past hour, this morning (or afternoon), today, this week, or this month etc. As a result, the location of current state can be the POI (e.g. a restaurant) the user is staying right now if the time window is a few seconds or a larger area (e.g. San Francisco) in case the time window is past few days.

Embodiments include tracking user stays of the user over time, wherein the user stays include at least one location and creating a user profile for the user based at least in part on at least one of an arrival time, a duration or a frequency of visits of the user at each of the user stays. For at least some embodiments, the user profile is defined as the results of location based user behavior analysis. For at least some embodiments, the user profile includes the fundamental statistics, such as the number of visits, the time of visit, and the average and total duration of all visits to one POI. Furthermore, for at least some embodiments the user profile includes location behavior patterns learned from the fundamental statistics. For example, it includes user's location preference, such as which POIs or EOIs a user visits often, at what time of the day and/or day of week, user's location transitions between different POIs, and user preferred routes between POIs according to trail information. For example, the statistical transitions can include one-step location behavior change, such as the user visiting place A after place B, or multi-step location behavior change, visiting place A after place B and then going to place C. In addition, for at least some embodiments, the user profile includes user manually input preferences. The user profile includes characteristics of the user. One characteristic of the user includes a history of locations of interest of the user. For at least some embodiments, the user profile includes the statistics of the categories and subcategories of the POIs and EOIs the user has visited.

FIG. 1 shows an example of a map that depicts locations traveled by an individual that further depicts points of interest (or user stays). A line 110 depicts the locations traveled by the user. During the travels of the user, the user visits various points of interest. Based on the visited locations, additional points of interest can be recommended and/or suggested to the user. The locations traveled and the time spent at or between locations can be used to identify user stays of the user.

The trail of the user can be marked by differing speeds (depicted by varying thickness of the line 110) of travel between points of interest. The travel speed can be used as one piece of information in the determination of trails of interest.

A series of points of interest (such as shown in FIG. 1) can be termed a "trail of interest". The trail of interest includes a sequence of location data points. Embodiments of each location data point can include the attributes of latitude, longitude, altitude, speed and/or a timestamp. More specifically, an embodiment of a trail of interest is defined by a plurality of points of interest of the user. For an embodiment, a frequency and/or speed of the user between points of interest is used to determine a level of importance of the trail. For example, if a user travels along one part of a trail (or route) frequently, with low speed (meaning it is a local street, rather than high way, which can be verified by using a geo-database), then some types of services along the this part of the trail can be recommended to the user, with the expectation that it is more likely for the user to use the service, because it is easier for the user to stop by the service. For an embodiment, the level of importance is included within a user profile.

Figure 2:
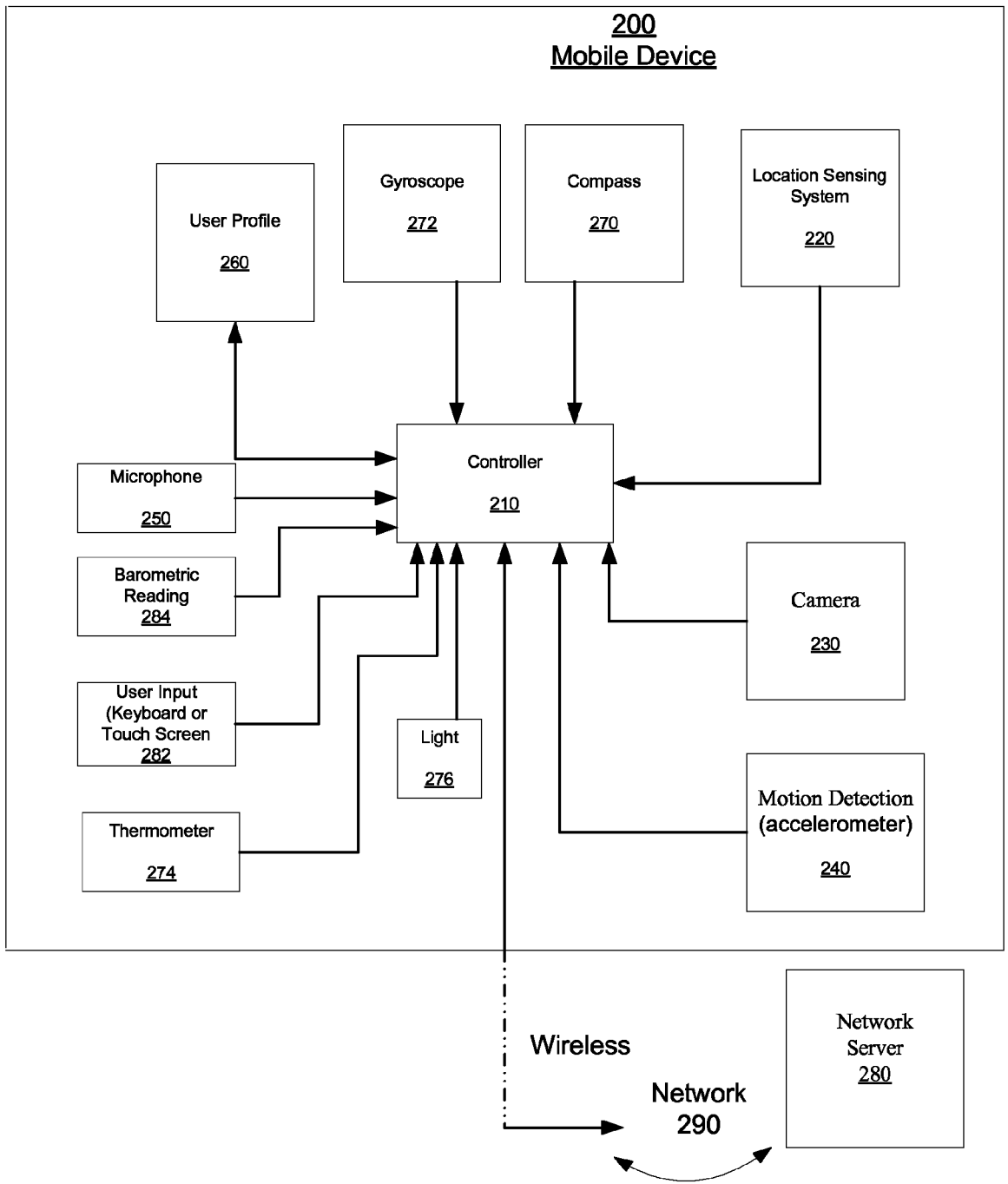
FIG. 2 shows an example of a mobile device that the disclosed embodiments for determining user stays of the user of the mobile device are operable, according to an embodiment.

FIG. 2 shows an example of a mobile device that the disclosed embodiments for determining user stays of the user of the mobile device are operable, according to an embodiment. For embodiments, user location data is continuously collected from the mobile device over time. The data can consist of multiple streams of sensor data with timestamps.

Spatial information (such as, longitude, latitude, altitude) of the user can be determined by a location sensing system, such as a global positioning system (GPS) 220 and/or network-based location, such as location determined by cellular and/or WiFi networks of the mobile device 200. Based on the spatial information, a controller 210 (or another controller connected to the controller 210) of the mobile device 200 can roughly determine locations of the user. GPS, however, can be limited because the exact location or the actual business (point of interest) visited by the user may not determinable from GPS alone. Embodiments provide alternate or additional pieces of location information as determined by the controller 210, or a controller electronically connectable to the controller 210.

Signals sensed by a motion sensor (for example, an accelerometer) 240 can be used to provide additional user-related information. That is, for example, the GPS 220 may be precise enough to narrow down the identification of a location of interest to three businesses. The signals generated by the motion sensor 240 can provide an indication of activity of the user, which can be used to additionally identify a location of interest. For example, when a department store (e.g. Walmart®) is located next to a cafe (e.g. Starbucks®), the user's motion pattern can be used to disambiguate between the two POI (points of interest), Walmart and Starbucks. If the user's motion pattern indicates that the user has been walking around most of the time, then the probability that the user visited the department store is higher. On the other hand, if the user's motion pattern indicates that the user has been sitting still most of the time, then the probability that the user visited the cafe is higher.

Images captured by a camera 230 of the mobile device 200 can be used to provide additional user-related information. That is, for example, signs on business proximate to the user's location can be used to determined points of interest.

Audio signals sensed by a microphone 250 of the mobile device 200 can be used to provide additional user-related information. That is, for example, loud noise versus quiet noise in the background of a user's location can be used to aid in determination of points of interest. For example, because the noise level in a library is usually low, if the noise level is low, then the probability that the user is in a library is higher than the probability that user is in a restaurant.

Direction of the user can be determined by, for example, a compass 270 of the mobile device 200. The compass 270 can provide present or historical directions of the user. The directions of the user can be used to aid in the determination of points of interest.

Rotation of the user can be determined by, for example, a gyroscope 272 of the mobile device 200. The gyroscope 272 can provide present or historical rotation of the mobile device of that the user carries. The rotation of the mobile device of the user can be used to aid in the determination of points of interest.

An ambient temperature of the user can be determined by, for example, a thermometer 274 of the mobile device 200. The thermometer 274 can provide present or historical ambient temperatures of the user. The temperature of the user can be used to aid in the determination of points of interest. For example, temperature can be used to determined whether the user is or was outside versus inside.

Exposure to ambient light by the user can be determined by, for example, a light sensor 276 of the mobile device 200. The light sensor 276 can provide present or historical light exposure of the user. The light exposure of the user can be used to aid in the determination of points of interest. For example, sensed levels of IR can be used to determine whether the mobile device of the user is, for example, in the user's pocket, and to determine whether the user is in direct sun light.

User-input information can be received from a key-board or touch screen 282. Based on a determination that the user is using the input (key-board or touch screen) behavior if the user can be inferred, and therefore, educated guesses can be made regarding the location of the user. For example, if the user is inputting information, the user is probably not driving. If the user is talking, the user is probably not at a movie theater.

Barometric information from a barometric sensor 284 can be sensed and used to determine user-related information. For example, the barometric information can be used to deduce an altitude of the user, and therefore, be used to determine what floor of a building the user is presently located. GPS can be inaccurate inside of buildings, and therefore, barometric information can be very useful.

A network 290 that the mobile device 200 is connected to, can provide additional user-related information. For example, a server 280 of the network can have street view images that provide additional information regarding a general location that a user is at. The connection to the remote server 280 is optional, because the mobile device may be disconnected from the server. In addition, part of the user profile 260 computation can be performed on the mobile device, and may not be required to be run on the server.

It is to be understood that the processing of the described embodiments for determining user stays can occur at the controller 210, at the network server 280, or at a combination of both the controller 210 and the network server 280. If the connection of the network 290 allows the location information to be properly uploaded to the network server 280, then nearly all of the user stay processing can occur at the network server. However, if the connection of the network 290 is not available, at least a portion of the user stay processing can occur at the controller 210 of the mobile device 200.

For at least some embodiments, one or more of the sensed states of a combination of the sensed states of the described sensors (220, 230, 240, 250, 270, 272, 274, 276, 282, 284) and/or network connectivity (290) are used in user stay determination. The sensed states of the sensors change over time. For an embodiment, patterns or a series of patterns in the one or more sensed states of the described sensors can be identified and/or recognized. For at least some embodiments, changes in the patterns indicate the user is arriving (start time) or departing (end time) a POI, or that the user is in transit between users stays or POIs. Therefore, for at least some embodiments, the information of the sensed states of the sensors can be used to determine user stays. For example, if the motion state (240) indicates that the user is stationary over a period of time, for at least some embodiments, this is used to identify the period of time as a potential user stay. If the network (290) is connected to a wireless station for a period of time, for at least some embodiments, this is used to identify the period of time as potential user stay. If a sensed light intensity of the light sensor 276 of the mobile device maintains a constant level (the same) of sensed light for a period of time, this information can be used to indicate a user stay. If the sensed temperature maintains the same level for a period of time, that information can be used to indicate a user stay.

Figure 3:
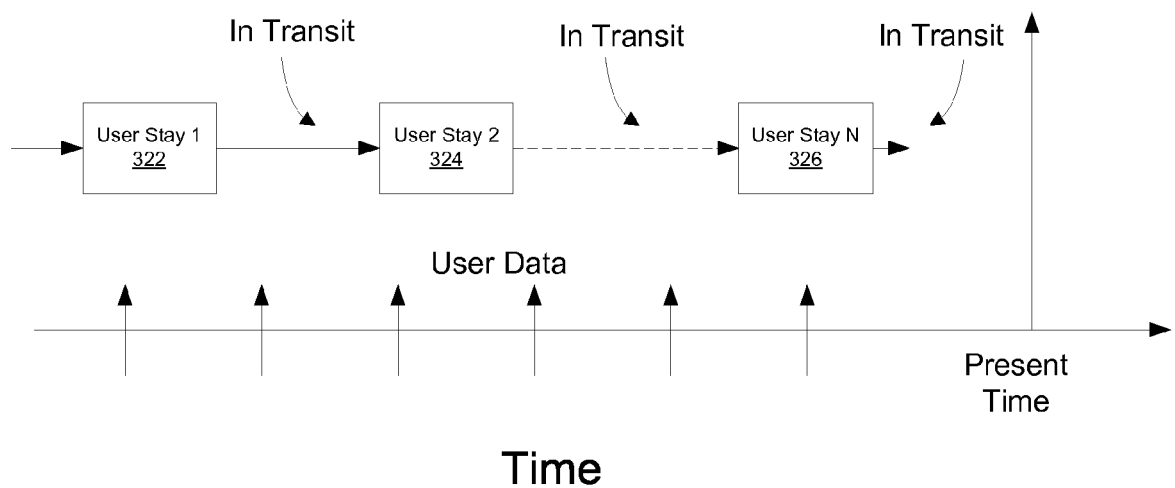
FIG. 3 shows a time-line of locations of the mobile device, which can be used for determining user stays of the user of the mobile device, according to an embodiment.

FIG. 3 shows a time-line of locations of the mobile device, which can be used for determining user stays of the user of the mobile device, according to an embodiment. As shown, a sequence of user stays 322, 324, 326 are identified based on location data sensed by the mobile device while the mobile device and the user of the mobile device are in transit.

As shown, user data (including at least location data) is sensed over time. As will be described, based on the user data, user stays are identified. As shown, user stays are typically separated by "in transit" times, wherein the user is in transit between user stays.

Once a user stay is detected, events can be triggered on the mobile device, remote network, or other mobile devices. For example, for at least some embodiments, once the mobile device arrives at a POI or departs from a POI as determined by the detected user stays, a SMS message, a push notification, or an email is sent to other mobile devices that have subscribed to be notified by this type of user stay detection event. For at least some embodiments, detected user stays are organized and saved as a journal of places that have been visited. For at least some embodiments, detected user stays are shared or published in social networks. For at least some embodiments, user stays detected from multiple users are used to detect if the users (that is, multiple connected users) have been at the same place. User stays generated by massive numbers of users can be used to trace the propagation of infectious disease among the users.

Figure 4:
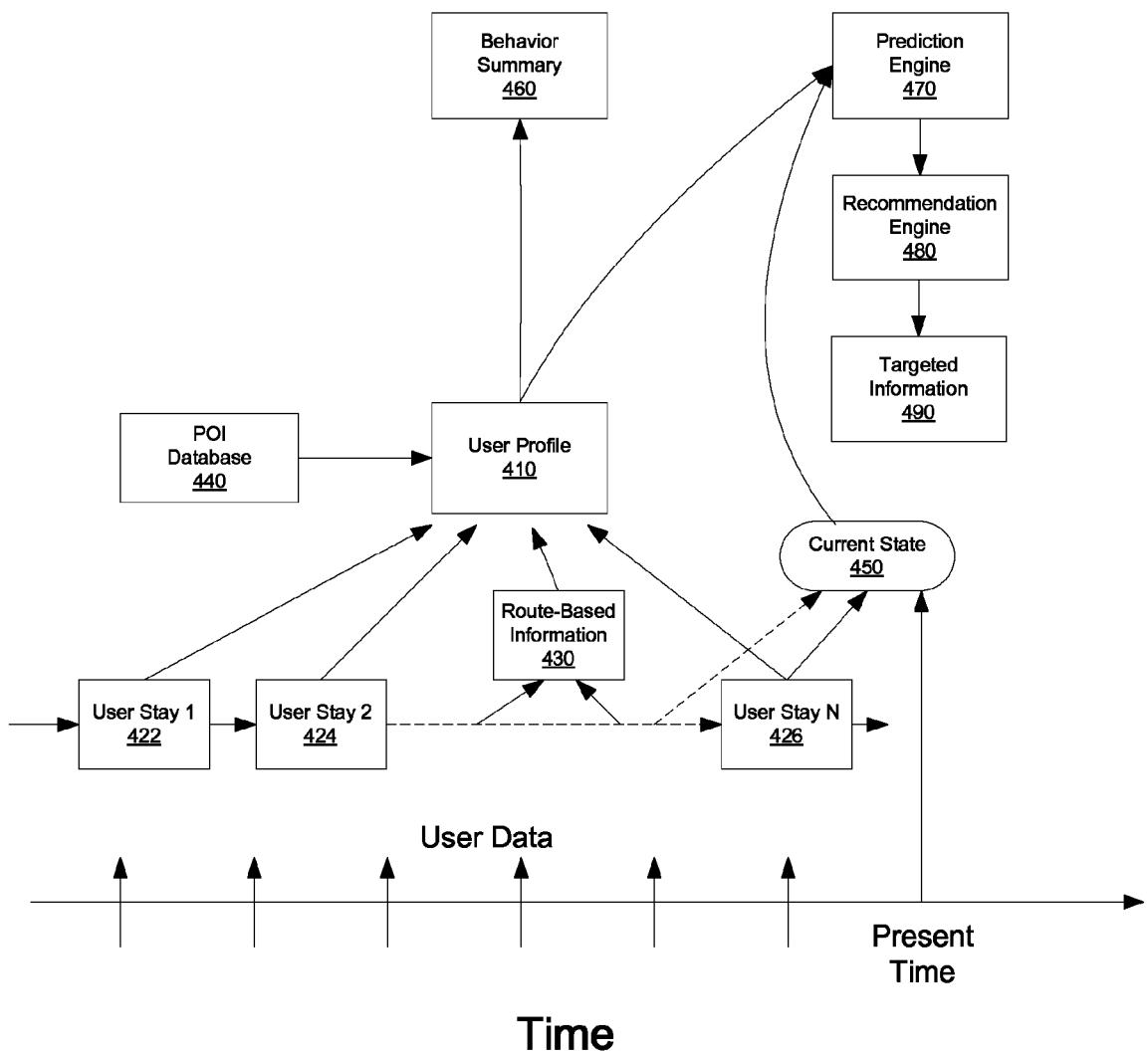
FIG. 4 shows a time-line of user stays of the mobile device, which can be used for providing services to the user of the mobile device, according to an embodiment.

FIG. 4 shows a time-line of user stays of the mobile device, which can be used for providing services to the user of the mobile device, according to an embodiment. The previously described user stays (such as, user stays 422, 424, 426) are generated over time by the historical user location data, in which, for at least some embodiments, each is referenced to a POI in a POI database 440. Route-based information 430 can be inferred from historical commuting behavior of the user moving from one POI to another POI. Embodiments includes a user profile 410 that is generated and continuously updated based on, for example, POIs from a POI database 440, the user stays 422, 424, 426 and route-based information 430. A user profile is generated by analyzing all user stays of the user and extracting user behavior patterns. The user profile 410 can be used to generate a behavior summary 460 of the user of the mobile device. Behavior summary of a user can be created based on the user profile, at a daily, weekly, monthly or yearly basis.

In addition to the user profile 410, embodiments further include determining a current state 450 of the user of the mobile device. As shown, an embodiment of the current state is based upon current user stay information 426 and/or recent user stays, and current user data.

Based on the user profile 410 and the current state 450, predictions of the behavior of the user can be made by, for example, a prediction engine 470. Prediction engine 470 takes static inputs from the user profile 410, such as frequently visited POIs and transitional patterns between POIs, and dynamic inputs from the current state 450 to infer the routes the user may take and POIs the user may visit in the future. Based on the predicted behavior, recommendation can be provided to the user via recommendation engine 480 and targeted information 490 can be provided to the user of the mobile device. The prediction engine 470 can be disabled so that the recommendation engine 480 can make targeted information based on the user profile 410 and the current state 450 directly.

An embodiment includes tracking a current state of the user. For embodiments, the current state includes user stays within a predetermined time of a present time, wherein the predetermined time is dependent upon an application of the user device or an observed behavior of a user of the user device.

For at least some embodiments the user profile includes a history of the user stays of the user. For an embodiment, the user stay includes the point of interest the user has visited, an arrival time and a length of time the user stays at the point of interest.

At least some embodiments further include determining route-based information. Further, embodiments include updating a current state of the user based on the route-based information. Another embodiment further includes predicting future user stays based on the route-based information. Embodiments of determining route-based information include determining a plurality of points of interest, wherein the plurality of points of interest define a trail of interest of the user. As previously described, an embodiment a trail of interest is defined by a plurality of points of interest of the user. For an embodiment, a frequency and/or speed of the user between points of interest is used to determine a level of importance of the trail.

At least some embodiments further include providing the user with targeted information base on the user profile. For specific embodiments, the targeted information includes at least one of coupons, advertisement, notices of events. Other embodiments include estimating a likelihood of conversion of targeted advertising based on the user profile, and/or measuring a conversion of targeted advertising based on the user profile. Additionally, a rewards-based program can be facilitated based on the user profile. That is, visits to a merchant can be monitored, and rewards automatically applied based on visits to the merchant.

For an embodiment, the user profile is supplemented based at least in part on websites visited by the user. For one implementation further includes supplementing the user profile based on information posted by the user on at least one of the websites. For another implementation, at least one of the websites comprises a social website.

Embodiments include providing the user with suggestions. For example, one embodiment includes providing the user with at least one suggestion based on identified points of interest. Another embodiment includes providing the user with at least one suggestion based on at least one predicated future point of interest. Further, embodiments include modifying (including changing or removing) a suggestion based on the user location history and user profile.

For at least some exemplary embodiments, route-based information is defined as the name of each route a user takes, the route usage frequency, the time when the route is usually taken, and the general speed information on the route.

Embodiments include a prediction engine that processes dynamic inputs from the user profile of a user and current state of the user to infer future POIs the user may visit and the routes the user may take. The prediction results can be used for providing targeted information to the user.

Once the profile has been created, the user can be provided with targeted information based on the user profile. Additionally or alternatively, a likelihood of confirmation of targeted advertising based on the user profile can be estimated. Additionally, the user profile can be supplemented based at least in part on websites visited by the user.

Embodiments include providing the user with at least one suggestion based on the identified points of interest. For an embodiment, this includes providing the user with at least one suggestion based on at least one predicated future point of interest. For an embodiment, a suggestion is modified based on the user profile. For example, a user profile could be used to determine that a user has already satisfied the condition of the suggestion because profile of the user suggests the user has already visited the appropriate location. Clearly, modifying can include changing or removing the suggestion.

As an example of the use of suggestions, a user's shopping list can be tracked, and the items on the shopping list can be correlated with the shops (special POIs) the user usually visits. When the user is physically close to a shop that has one or more items on the user's shopping list, a suggestion can be generated to remind the user to stop by the shop to purchase the item.

After such a suggestion is generated, the mobile device monitors the user's location history, and if it detects that the user stops at the specific shop, where a specific item on the shopping list has been in one of the suggestions presented to the user, the system can automatically remove the specific items, or reduce the priorities of those items.

Examples of intelligent personal services include spatial suggestions. An exemplary spatial suggestion includes a reminder to a user of a mobile device that is based on spatial information of the mobile device. Reminders include suggestions that are useful to the user. Intelligent personal services include, for example, making health-related suggestions, such as doing more physical activities (e.g. walking) than sitting still. Embodiments of personal services include providing recommendations or suggestions to the user based on the user's habits and interests, for example, kid-centric events during a weekend for people with children. Services can also include commercial services, such as recommending a cheaper gas station near the user's regular commute route.

Location based user behavior analysis can also be useful to a mobile advertiser. For example, after a mobile advertiser has displayed an advertisement to a user, the advertiser would like to determine if the user has been to the merchant in the advertisement and conducted business, and determine if the advertisement has been confirmed. Additionally, advertisers desire user profile information, which enables the advertiser to intelligently send targeted advertisements.

When, for example, the system detects that the user often goes to an elementary school or a child day care center, the system infers that the user may have one or more children, then the system may generate targeted information to the user for child-related events.

After the system detects the user usually go to a local public library on Saturday morning, the system can automatically generate a suggestion on Saturday morning when the user leaves home to remind the user to bring the books to return to the library.

The system tracks when the user gets gasoline for his car, and tracks the number of miles the user has driven the car after each refill. When the system detects that the user has used most of the gasoline in his tank based on the number of miles driven and the speed, as a result of the road type, such as local streets or high ways, the system can start to find gas station with low prices and make targeted information to the user.

Figure 5:
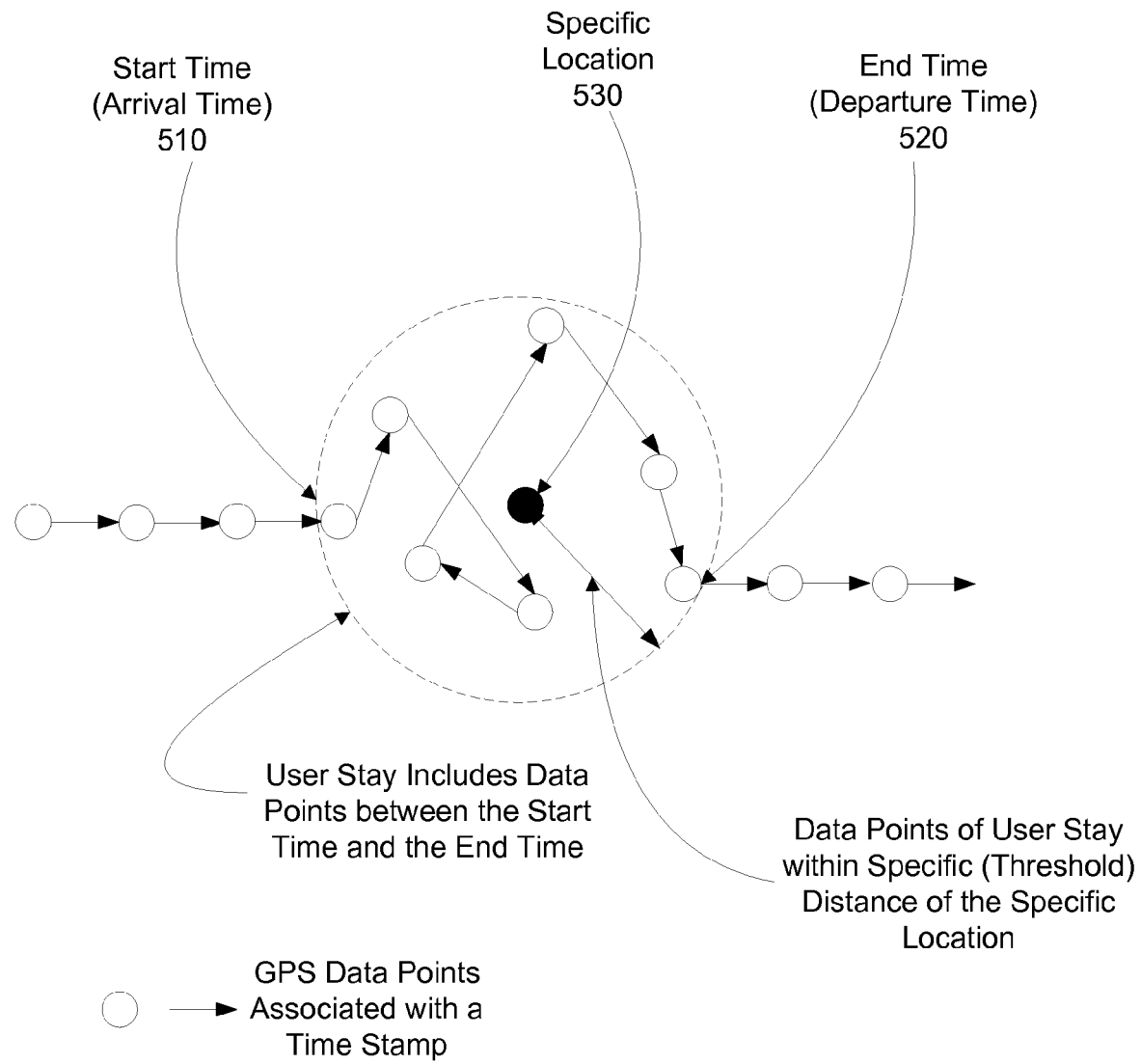
FIG. 5 shows a time sequence of location data points that are used to identify a user stay, according to an embodiment.

FIG. 5 shows a time sequence of location data points that are used to identify a user stay, according to an embodiment. The time sequence includes successive location (for example, GPS) data points. For the sequence of location data points, a user stay can be calculated. The user stay includes all location data points between the determined start time 510 and the determined end time 520. For an embodiment, the location data points within the user stay are all located within a specific distance of a specific location 530 for at least specific minimum time duration based on the location information. Further, the start time 510 of a user stay is determined based on the location information, the specific location 530 and the specific distance, and the end time 520 of the user stay is determined based on the location information, the specific location and the specific distance.

Various embodiments as will be described include calculation or determination of the specific location. For an embodiment, the specific location is determined based on a statistical analysis of a running set of location data points. Further, the specific distance can be set by a predetermined threshold. Further, the specific minimum duration of time can be set by a predetermined threshold. For at least some embodiment, the threshold of the specific distance and the threshold of the minimum time duration are adaptively selected based on candidate POIs associated with the specific location.

As mobile devices with GPS sensors become increasingly pervasive, it has become very useful to track a user of a mobile device and determine where the user has spent time during, for example, a day. The described embodiments acquire a user's location data and automatically detect his places of interest or significance.

For at least some embodiments, user data (including at least location data) is collected by a small program running on the mobile device and transferred in a format of (such as, current time, current location coordinate, estimated accuracy of that location coordinate) as best as can be determined by the mobile device. As described, the location data can include information from cellular and WiFi networks as well as GPS location points. For at least some embodiments, the collected user data is stored in a database, and can be processed later in batch mode.

Place Acquisition

For an embodiment, during place acquisition, the input track points (location data points) are processed, generating a set of user stays including a starting time, a duration, and a centroid point that is centroid of the user stay. Place acquisition includes processing of the input track points first by ordering them according to their time stamps. Outliers due to noise in the location determining devices are removed, and the remaining track points are then sent through a segmenting process. Each candidate user stay produced by segmentation is adjusted in a massaging process. After massaging, smaller segments are filtered out. A centroid for the surviving user stay is computed along with its duration. Finally the user stay is output as detected place results.

For at least some embodiments, outlier removal is performed by fitting an empirical distribution (such as Gaussian) to the data in terms of GPS speed, 2-D spatial location (latitude, longitude), and GPS accuracy. The data points lying outside of a certain range ($95^{th}$ percentile, for instance) will be removed from further analysis. The outliers or series of continuous groups of outliers that are removed are actually summarized and attached to the non-outlier point as prefix and suffix.

For at least some embodiments, segmentation is executed as a state machine. The initial state is outside. Each track point is examined in chronological order. Upon satisfaction of a set of conditions, which can be referred to as "arrival conditions", a state change is triggered that corresponds to arrival (start time) of a user stay. The state is then determined to be "inside" the user stay. On arrival, the segmentation algorithm continues to examine data in chronological order. However, the set of conditions being tested is a different set. The different set of conditions is testing departure (end time) and the conditions can be referred to as "departure conditions". When the current state is inside, and departure condition is triggered, the state is changed to outside. The series of track points with "inside" state is passed onto the next step.

Arrival (Start Time)

At least some of the described embodiments include a forward-looking criterion to determine arrival into a user stay. For this embodiment, a forward look in time and a predetermined time period are used at each track point (which is also an instant in time), to compute an arrival (start time).

For an embodiment, a smoothed speed is observed to determine whether it is slow enough. For an embodiment, the smoothed speed at a track point is the average speed of the device as calculated based on GPS distance and time elapsed during a predetermined time interval (such as, 5 minute interval) around each point.

For an embodiment, a bearing deviation is observed to determine whether it is large enough. For an embodiment, the bearing at a track point is the angle between two segments. One segment is from the last track point to North Pole. The other segment is from the last track point to the current track point. The standard deviation of this number during that predetermined time period is the bearing deviation.

For an embodiment, absolute steering is observed to determine whether it is small enough. For an embodiment, the steering is the bearing at the current track point minus the bearing at previous track point. The average of the absolute values of this number during the time window is the absolute steering.

For an embodiment, the leading trail is observed to determine whether it is straight enough. For an embodiment, straightness of the trail is measured by $r^2$ from regression where latitude is dependent variable and longitude is independent variable. The closer $r^2$ is to zero the straighter the trail is.

For an embodiment, identifying an arrival (start time) includes determining that the leading trail has small enough complete, single, average, or quartile linkage distance. For an embodiment, the linkage function includes calculation of a user stay quality metric. For an embodiment, a user stay is hypothesized to exist during a leading period of time that is either determined by a fixed time period or including contiguous points all of which are within some distance of the current track point. This hypothetical user stay is then used to produce the desired metrics. For an embodiment, the desired metrics includes an average distance of all track points from median user stay locations. For an embodiment, the desired metrics includes an average distance of all track points from centroid of the user stay. For an embodiment, the desired metrics includes a maximum distance of all track points from median user stay location. For an embodiment, the desired metrics includes a minimum distance of all track points from median user stay location. For an embodiment, the desired metrics includes a maximum distance of all track points from centroid of the user stay. For an embodiment, the desired metrics includes a minimum distance of all track points from centroid of the user stay. For an embodiment, the desired metrics includes a median distance of all track points from centroid of the user stay. For an embodiment, the desired metrics includes a median distance of all track points from median user stay location. For an embodiment, the desired metrics includes a 95 percentile of distances of all track points from centroid of the user stay. For an embodiment, the desired metrics includes a 95 percentile of distance of all track points from median user stay locations.

For an embodiment, identifying an arrival (start time) includes determining that the surrounding trail is straight enough. For an embodiment, track points from a fixed time window before and after the current track point are used in a calculation of correlation between latitude and longitude. This correlation indicates how near to a line these points lie on. A score of 0 means they are co-linear. The surrounding trail being straight indicate that the current track point is in the middle of traveling and therefore not a good entrance point into a user stay.

In addition to forward looking computation, at least some embodiments also backtrack by looking backwards in time from the current track point. For a backtrack computation, for at least some embodiments, the acceleration in the past period must be small enough (in fact, negative enough). For an embodiment, the acceleration at the current track point is approximated by first calculating speed using the distance and time between each track point and the previous track point. The change in speed between the current track point and previous track point is the computed acceleration. The computed accelerations in the past minute is averaged and used as the smoothed acceleration. If the smoothed acceleration is small enough or negative, then it can be determined that the user has enter a user stay.

For an embodiment, a GPS receiver is turned off, or put in a standby mode due to lack of motion. If the GPS receiver has been turned off by the client system, then it is likely that the user has entered a user stay. The client system (mobile device) attempts to conserve energy when the user is stationary. So this state change can trigger an entrance (start time) to a user stay.

For an embodiment, arrival (start time) is triggered when the disjunction of each of above logics is true and the current track point must have valid GPS signal. The selection of track points into acquisition of user stays and calculation of centroid points is based on accuracy and the status of GPS or network location status.

Departure (End Time)

Once inside the candidate user stay and the arrival (start time) triggered, a set of conditions is checked, and whenever one of them matches, the candidate user stay is determined. An embodiment includes backward looking conditions used for terminating the candidate user. For an embodiment, this includes determination of whether the motion is linear enough. For an embodiment, the latitude-longitude correlation of high quality points within the candidate user stay should be small or else departure (end time) is triggered.

For an embodiment, identifying the departure (end time) includes determining whether the current point is far enough from the candidate user stay using quartile linkage distance. For an embodiment, the distance from current track point to every track point in the candidate user stay is computed. The 95 percentile is compared with a constant and departure is triggered when current point is too far from the preceding candidate user stay.

For an embodiment, identifying the departure (end time) includes determining that the speed of the mobile device is too fast. That is, if the current smoothed speed is high then departure is triggered.

For at least some embodiments, forward looking conditions are used for terminating the candidate user stay, and identifying a departure (end time) of the user stay.

For an embodiment, identifying the departure (end time) includes determining that the bearing of the mobile device is uniform enough. The steering is uniform enough.

For an embodiment, identifying the departure (end time) includes determining that the GPS receiver is in an inaccurate state. If the average accuracy of GPS points within the current candidate user stay is too high then the algorithm triggers departure from the candidate user stay.

For an embodiment, a signal gap in the received GPS signal is monitored and detected. That is, if the GPS receiver is turned off for long enough (that is, greater than a selected time period threshold) then the candidate user stay is terminated, and the departure (end time) identified.

For an embodiment, the distance of the mobile device from the candidate user stay is monitored. That is, the distance from current track point to each track point in the candidate user stay is computed. The $90^{th}$ percentile is used as a measure of the distance from the current track point to candidate user stay. If this distance is too far then the candidate user stay is terminated.

For an embodiment, the distance from Candidate user stay to the next possible user stay is monitored. That is, for an embodiment, a future possible user stay is hypothesized based on distance from the current track point. The median distance of each track point in the candidate user stay and each track point in the hypothesized user stay is computed. If this distance is too large then the current candidate user stay is terminated, and the departure time (end time) is identified.

After detecting the user stay by arrival/departure logic, for at least some embodiments, each user stay is massaged in the sense of removing excessive time periods based on the device GPS state as well as the reported accuracy and distance relative to all other points and relative to the centroid points computed in previous step. In particular, the track points that are deemed to have high accuracy are discarded if they are far enough from the other points or the centroid point.

Centroid Point Calculation

For at least some embodiments, a final step in user stay acquisition is the determination of a centroid point. At least some embodiments include the use of a variety of methods for determining this centroid point to a user stay. Before this centroid point is computed, a filter can be applied to select the points to be included in this calculation. One or more algorithms can be applied to the data points to allow computation of the final centroid point from these filtered points.

For an embodiment, the centroid point to the user stay is computed as coordinate-wise median of the track points remaining after filtering. This is an efficient, robust and effective approximation of the centroid point of each user stay.

For an embodiment, the centroid point to the user stay is computed as coordinate-wise mean of the track points remaining after filtering. This is an efficient, robust and effective approximation of the centroid point of each user stay.

For an embodiment, the centroid point to the user stay is computed as a weighted average of the track points remaining after filtering. For at least some embodiments, the weight given to each track point is computed based on one or more of an accuracy of the location data for this track point, and a state of GPS and location determining device. An embodiment includes a symmetrically decayed weight that falls off as an exponential function of the time from a specified point in time. An embodiment includes determining a time elapsed since or to the absolutely closest time within the user stay whence there is a GPS data point. An embodiment includes determining the linearity of track points immediately preceding and following the current point. An embodiment includes determining the time distance from the chronological center of the current user stay. An embodiment includes determining the time from the current GPS track point to the next GPS track point.

Time Weighted Centroid

At least some embodiments include the calculation of a time weighted centroid. For an embodiment, the centroid of a user stay is calculated by giving a different weight to each GPS point that belongs to the user stay. For an embodiment, the weight for each point is determined by the time duration in which it is believed that the GPS measurement remains valid.

For an embodiment, the weight is assigned as $W(n)=T(n+1)-T(n)$, where $T(n)$ and $T(n+1)$ are the sample time for $P(n)$ and $P(n+1)$, respectively, if a GPS point $P(n)$ is followed by another GPS point $P(n+1)$. For an embodiment, the weight is assigned as $W(n)=T\_gps\_off-T(n)$, where $T\_gps\_off$ is the time when client switches to the GPS OFF state, if a GPS point $P(n)$ is the last one for the stay. For an embodiment, the time weighted centroid is calculated as Latitude_of_Centroid=Sum (Latitude(i)*W(i))/Sum(W(i)), and Longitude_of_Centroid=Sum(Longitude(i)*W(i))/Sum (W(i)), where i=0, 1, . . . N.

For an embodiment, the time interval between two GPS points is assigned to the two GPS points equally divided, i.e. half-by-half, if nothing is known about how the GPS points were collected. However, for at least some embodiments, the mobile device (client) avoids collecting location data (such as, GPS samples) unless necessary. Therefore, an embodiment includes weighting to give bias to the GPS sample preceding the time interval.

Massage and Merge

After user stays have been identified per the described embodiments, at least some embodiments include further massage processing the detected user stay candidates. For an embodiment, massage processing includes finding the first and last trustworthy track point in the user stay. For an embodiment, trustworthiness is a function of the source of the track point's location (GPS, WiFi or network) and the accuracy reported by that device. A centroid is computed at this moment using only track points between the first and last trustworthy track point, inclusive. The massage processing then proceeds from the very start of user stay and removes track points that are too far from the centroid computed in this stage of massage processing. The iteration terminates when the first trustworthy point is reached. In similar fashion, massage processing operates on end of the user stay. The massage processing includes inspection of track points from the very end of the user stay, removing points that are too far from the centroid computed in this stage of massage. The iteration, again, terminates when the last trustworthy track point of the user stay has been reached.

After massage processing, candidate user stays that last less than a predefined time duration are removed. Next, candidate user stays are checked for intersection in terms of time. For an embodiment, if there is intersection in the time periods of two user stays, the two user stays are merged. If multiple user stays intersect in time, they are merged together.

Lastly an iterative processing repeatedly merges user stays that precede and follow each other immediately. The iterative processing terminates when no merge happens during the iteration. Two user stays are merged if they are close in time (for example, within certain minutes of each other) and that they are within close proximity of each other. For at least some embodiments, the proximity of two user stays is determined based on the closest distance between any two track points drawn from each user stay. For at least some embodiments, the proximity of two user stays is determined based on the furthest distance between any two track points drawn from each user stay. For at least some embodiments, the proximity of two user stays is determined based on the median distance between pairs of track points drawn from each user stay. For at least some embodiments, the proximity of two user stays is determined based on the average distance between all pairs of track points drawn from each user stay. For at least some embodiments, the proximity of two user stays is determined based on the distance between the weighted centroid of the two user stays.

For at least some embodiments, the results of merge processing are user stays that require re-computation of their centroid location.

Figure 6:
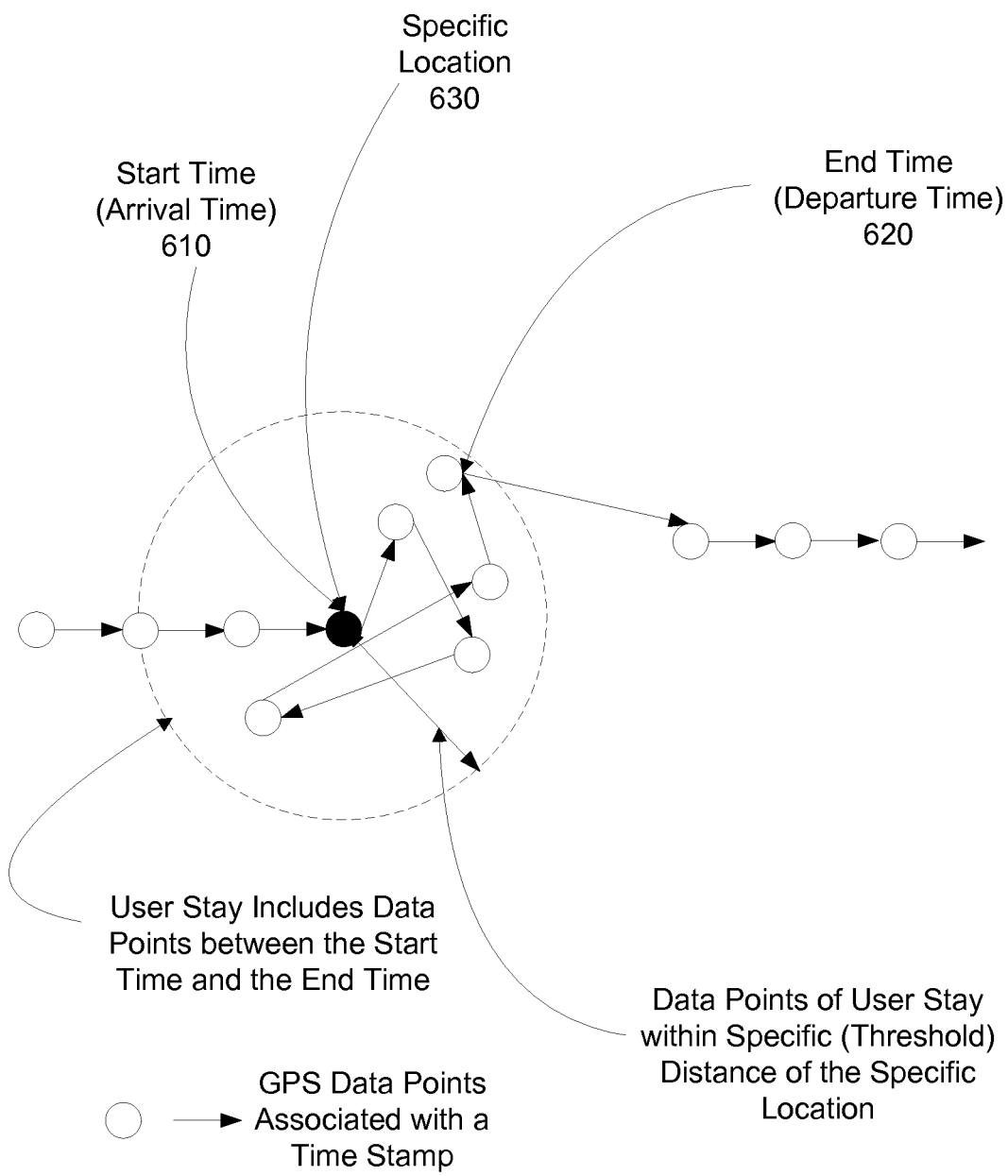
FIG. 6 shows a time sequence of location data points that are used to identify a user stay, according to another embodiment.

FIG. 6 shows a time sequence of location data points that are used to identify a user stay, according to another embodiment. For this embodiment, the specific location corresponds with the location data point that is determined to be the start time 610 of the user stay. Again, for this embodiment, the user stay is determined based on the start time 610, the end time 620, and the specific location 630 (which in FIG. 6 corresponds with the start time 610).

Figure 7:
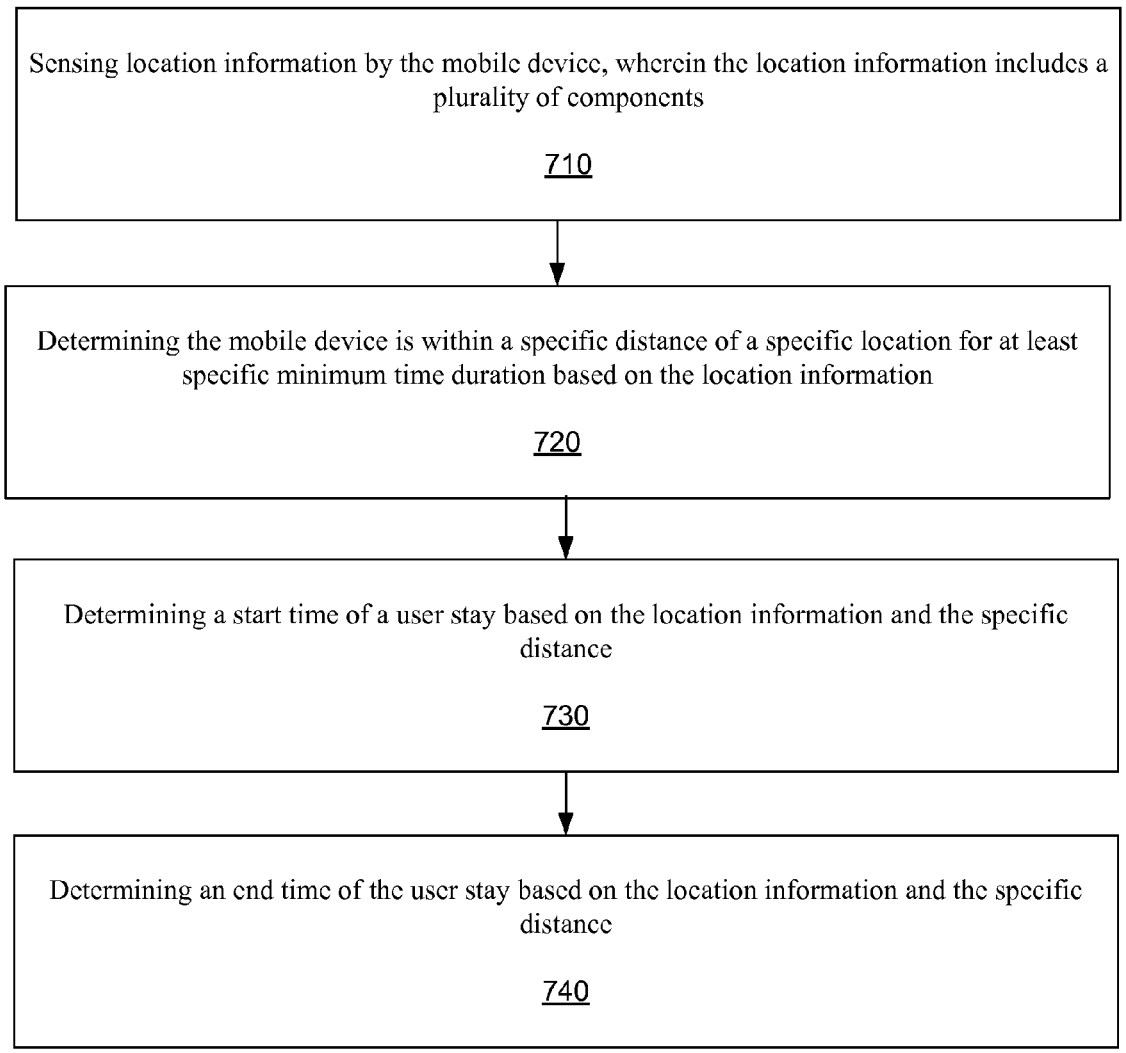
FIG. 7 is a flow chart that includes steps of an example of a method of automatically determining user stays of a user of a mobile device, according to an embodiment.

FIG. 7 is a flow chart that includes steps of an example of a method of automatically determining user stays of a user of a mobile device, according to an embodiment. A first step 710 includes sensing location information by the mobile device, wherein the location information includes a plurality of components. A second step 720 includes determining the mobile device is within a specific distance of a specific location for at least specific minimum time duration based on the location information. A third step 730 includes determining a start time of a user stay based on the location information, the specific location the specific distance. A fourth step 740 includes determining an end time of the user stay based on the location information, the specific location the specific distance.

For at least some embodiments, a user stay of a user of the mobile device is defined by the mobile device being within the specific distance (which for at least some embodiments, is determined by a threshold physical distance) of a location for at least the specific minimal duration (which can also be defined by a threshold period of time). As described, the location of the mobile device changes over time, and the specific location will change over time as the location changes. The location of the mobile device is tracked over time. A distance of the mobile device can be defined by the distance of each location point (such as, GPS data point) associated with the mobile device to a location, such as, the specific location. The minimal time duration can be defined by the amount of time the mobile device is within the specific distance (or threshold distance) from the specific location.

For at least some embodiments, the specific location adaptively changes over time as the mobile device moves. At least some embodiments include determining the specific location, including statistically calculating the specific location based on a plurality of locations of the mobile device over a period of time. For an embodiment, the period of time is determined based on the start time and the end time.

An embodiment includes associating a candidate Point of Interest (POI) with the specific location, and adaptively determining the specific distance based on the POI. An embodiment includes adaptively determining the specific minimum time duration based on the POI.

As stated, location data points are generated for the mobile device. Further, at least some embodiments include determining whether the data points are within the specific distance of the specific location. For an embodiment, the specific distance is determined as the average distance of all track points (data points) from a median user stay location. For an embodiment, the specific distance is determined as an average distance of all track points from centroid of the user stay. For an embodiment, the specific distance is determined as a maximum distance of all track points from median user stay location. For an embodiment, the specific distance is determined as the minimum distance of all track points from median user stay location. For an embodiment, the specific distance is determined as the maximum distance of all track points from centroid of the user stay. For an embodiment, the specific distance is determined as the minimum distance of all track points from centroid of the user stay. For an embodiment, the specific distance is determined as the median distance of all track points from centroid of the user stay. For an embodiment, the specific distance is determined as the median distance of all track points from median user stay location. For an embodiment, the specific distance is determined as the 95 percentile of distances of all track points from centroid of the user stay. For an embodiment, the specific distance is determined as the 95 percentile of distance of all track points from median user stay locations.

Location Information

For at least some embodiments, the location information includes at least a time stamp, latitude, longitude. For at least some embodiments, the location information includes at least one of speed, accuracy of location, location type (GPS or network), and motion states.

For at least some embodiments, the location information includes at least controller state information. That is, the controller of the mobile device, or other controllers, such as, a GPS controller may selectively enter low-power of sleep states upon detecting limited activity of the mobile device. Therefore, it can be deduced that the mobile device is experiencing limited motion or location change. Accordingly, for at least some embodiments, the location information includes at least GPS state information, which is defined, controlled and provided by a controller of the mobile device, and wherein the GPS state information includes a GPS off state, a GPS wake up state, and a GPS on state. For at least some embodiments, the GPS state includes additional states, such as, a GPS driving etc.

For at least some embodiments, the location information includes a stream of location points, and determining the start time of the user stay includes determining that a physical distance between N successive location points is less than a threshold. For at least some embodiments, the location information includes a stream of location points, and determining the start time of the user stay comprises determining that an average speed between N successive location points is less than a threshold.

Start Time

For at least some embodiments, the location information includes a stream of location points over a period of time, and determining the start time of the user stay includes random movement pattern. For at least some embodiments, the location information includes a stream of location points over a period of time, and determining the start time of the user stay includes determining that a bearing deviation of N successive location points is greater than a threshold. In an embodiment, the bearing at a track point is the angle between two segments, wherein a segment is defined as including consecutive location points. One segment is the from the last track point to North Pole. The other segment is from the last track point to the current track point. The standard deviation of this number during that predetermined time period is the bearing deviation. For at least some embodiments, the location information includes a stream of location points over a period of time, and determining the start time of the user stay includes determining that an absolute steering of N successive location points is less than a threshold. In an embodiment, the steering is the bearing at the current track point minus the bearing at previous track point. The average of the absolute values of this number during the time window is absolute steering. For at least some embodiments, the location information includes a stream of location points over a period of time, and determining the start time of the user stay includes determining that a leading trail of the location points satisfies a straightness criteria, including measuring by $r^2$ from a regression, and determining that $r^2$ is less than a threshold. For at least some embodiments, determining that the leading trail includes a complete, single, average or quartile linkage distance. In an embodiment, the linkage function calculates user stay quality metric. A user stay is hypothesized to exist during a leading period of time that is either determined by a fixed time period or including contiguous points all of which are within some distance of the current track point.

For at least some embodiments, the location information includes a stream of location points over a period of time, and determining the start time of the user stay comprises determining acceleration between successive location points, and identifying acceleration between the points less than a threshold. For at least some embodiments, the acceleration at the current track point is approximated by first calculating speed using the distance and time between each track point and the previous track point. The change in speed between the current track point and previous track point is the computed acceleration. For example, the computed accelerations in the past minute is averaged and used as the smoothed acceleration.

For at least some embodiments, determining the start time of the user stay includes determining that a GPS receiver of the mobile device is deactivated, thereby indicating motion of the mobile device less than a threshold. Being deactivated indicates a lack of motion and then it is likely a user stay begins.

Quality Metric

For at least some embodiments, the location information includes a stream of location points over a period of time, and further comprising using a hypothetical user stay to produce desired quality metrics. For an embodiment, the quality metric is based on an average distance of the stream of location points from a median location of the user stay. For an embodiment, the quality metric is based on an average distance of the stream of location points from the centroid location of the user stay. For an embodiment, the quality metric is based on a maximum distance of the stream of location points from a median location of the user stay. For an embodiment, the quality metric is based on a minimum distance of the stream of location points from a median location of the user stay. For an embodiment, the quality metric is based on a maximum distance of the stream of location points from the centroid location of the user stay. For an embodiment, the quality metric is based on a minimum distance of the stream of location points from the centroid location of the user stay. For an embodiment, the quality metric is based on a medium distance of the stream of location points from the centroid location of the user stay. For an embodiment, the quality metric is based on a medium distance of the stream of location points from a median location of the user stay. For an embodiment, the quality metric is based on a 95% of distance of the stream of location points from the centroid location of the user stay. For an embodiment, the quality metric is based on a 95% of distance of the stream of location points from a median location of the user stay. For at least some embodiment, the small the above metrics, the highly likely the user has entered a user stay.

Centroid

For at least some embodiments, statistically calculating the specific location comprises estimating a centroid of the user stay based on at least the start time, the end time of the user stay, and the sequence of data points between the start time and the end time. For at least some embodiments, the location information includes a stream of location points over a period of time, and determining the end time of the user stay comprises determining that a distance of a location point from the centroid of is greater than a threshold.

For at least some embodiments, the location information includes a stream of location points over a period of time, and determining the centroid of the user stay comprises filtering the stream of location points, and determining a coordinate-wise mean of the a plurality of the location points of the stream. For at least some embodiments, the location information includes a stream of location points over a period of time, and determining the centroid of the user stay comprises filtering the stream of location points, and determining a weighted average of the a plurality of the location points of the stream. For an embodiment, the weighted average is dependent upon an accuracy of the location points. For an embodiment, the weighted average is dependent upon a state of a GPS receiver of the mobile user. For an embodiment, the weighted average is dependent upon symmetrically decaying a weight as an exponential function of time from a specified location point. For an embodiment, the weighted average is dependent upon time elapsed since or to an absolute closest time within a user stay wherein there is a GPS data point. For an embodiment, the weighted average is dependent upon a linearity of location points immediately preceding or following a current location point. For an embodiment, the weighted average is dependent upon a time distance from a chronological center of a current user stay. For an embodiment, the weighted average is dependent upon a time from a current GPS location point to a next GPS location point.

For an embodiment, the location information includes a stream of location points over a period of time, and determining the weighted average of the plurality of the location points of the stream comprising a time-weighted centroid algorithm. For an embodiment, time weighted centroid is a process that computes the centroid of a user stay by giving different weight to each GPS point that belongs to the user stay.

End Time

For at least some embodiments, the location information includes a stream of location points over a period of time, and determining the end time of the user stay comprises determining that a speed of the mobile device as determined from successive location points is greater than a threshold. For at least some embodiments, the location information includes a stream of location points over a period of time, and determining the end time of the user stay comprises determining that a bearing of successive location points is less than a threshold. For at least some embodiments, the location information includes a stream of location points over a period of time, and determining the send time of the user stay comprises determining that a uniformity of steering of successive location points is less than a threshold.

For at least some embodiments, the location information includes a stream of location points over a period of time, and determining the end time of the user stay comprises determining that an accuracy of GPS readings of the successive location points is less than a threshold. For at least some embodiments, the location information includes a stream of location points over a period of time, and determining the end time of the user stay comprises determining that GPS readings of the successive location points has been absent for greater than a time threshold.

Start Time, End Time

For at least some embodiments, the location information includes a stream of location points over a period of time, and determining the start and end time of the user stay further comprises adjusting the determined start or end time based on estimated distance between a location of the start time and a location of the end time. For at least some embodiments, the location information includes a stream of location points over a period of time, and determining the start and end time of the user stay comprises a merge algorithm that merges two or more adjacent user stays if the two or more user stays are within a threshold of time, and the two or more user stays are within a threshold of distance of proximity of each other.

Merging

For at least some embodiments, a merge algorithm merges two or more adjacent user stays if they are close in time (within certain minutes of each other) and that they are within close proximity of each other (within certain distance threshold).

For at least some embodiments, the location information includes a stream of location points over a period of time, wherein the steam of location points are received by a back-end server in a batch, which are then processed.

Although specific embodiments have been described and illustrated, the embodiments are not to be limited to the specific forms or arrangements of parts so described and illustrated.

The invention claimed is:

1. A method of automatically determining user stays of a user of a mobile device, comprising:
    persistently sensing, by at least one sensor of the mobile device, location information of the mobile device, wherein the location information includes a plurality of components, and wherein the location information includes a stream of location points;
    determining the mobile device is within a specific distance of a specific location for at least a specific minimum time duration based on the location information, wherein the specific distance has a non-zero value;
    determining a start time of a user stay based on the location information, the specific location and the specific distance, comprising determining that a physical distance between a plurality of N successive location points during the at least the specific minimum time duration is less than a threshold, wherein N is a predetermined number of location points; and
    determining an end time of the user stay based on the location information, the specific location and the specific distance, wherein
    the user stay is detected by clustering user location data continuously collected by the mobile device of the user, and matching the clustered user location data with a nearby point of interest.

2. The method of claim 1, wherein the specific location adaptively changes over time as the mobile device moves.

3. The method of claim 1, further comprising determining the specific location, comprising statistically calculating the specific location based on a plurality of locations of the mobile device over a period of time.

4. The method of claim 1, further comprising associating a candidate Point of Interest (POI) with the specific location, and adaptively determining the specific distance based on the POI.

5. The method of claim 1, further comprising associating a candidate Point of Interest (POI) with the specific location, and adaptively determining the specific minimum time duration based on the POI.

6. The method of claim 3, wherein statistically calculating the specific location comprises estimating a centroid of the user stay based on at least the start time, the end time of the user stay, and a sequence of location data points between the start time and the end time.

7. The method of claim 1, wherein the location information includes at least a time stamp, latitude, longitude.

8. The method of claim 1, wherein the location information includes at least controller state information.

9. The method of claim 1, wherein the location information includes a stream of location points, and wherein determining the start time of the user stay further comprises determining that an average speed between the N successive location points is less than a threshold.

10. The method of claim 1, wherein the location information includes a stream of location points over a period of time, and further comprising using a hypothetical user stay to produce desired quality metrics.

11. The method of claim 1, wherein the location information includes the stream of location points over a period of time, and wherein determining the start time of the user stay further comprises determining acceleration between successive location points, and identifying acceleration between the points less than a threshold.

12. The method of claim 1, wherein determining the start time of the user stay comprises determining that a location receiver of the mobile device is deactivated, thereby indicating motion of the mobile device less than a threshold.

13. The method of claim 1, wherein the location information includes the stream of location points over a period of time, and determining the end time of the user stay comprises determining that a distance of a location point from a centroid of the stream of location points is greater than a threshold.

14. The method of claim 1, wherein the location information includes the stream of location points over a period of time, and determining the end time of the user stay comprises determining that a speed of the mobile device as determined from successive location points is greater than a threshold.

15. The method of claim 1, wherein the location information includes the stream of location points over a period of time, and determining the end time of the user stay comprises determining that an accuracy of location readings of the successive location points is less than a threshold.

16. The method of claim 1, wherein the location information includes the stream of location points over a period of time, and determining the end time of the user stay comprises determining that location readings of the successive location points has been absent for greater than a time threshold.

17. The method of claim 6, wherein the location information includes the stream of location points over a period of time, and determining the centroid of the user stay comprises filtering the stream of location points, and determining a coordinate-wise mean of a latitude and a longitude of a plurality of the location points of the stream.

18. The method of claim 6, wherein the location information includes the stream of location points over a period of time, and determining the centroid of the user stay comprises filtering the stream of location points, and determining a weighted average of a latitude and a longitude of a plurality of the location points of the stream.

19. The method of claim 1, wherein the location information includes the stream of location points over a period of time, and determining the start and end time of the user stay further comprises adjusting the determined start or end time based on estimated distance between a location of the start time and a location of the end time.

20. The method of claim 1, wherein the location information includes the stream of location points over a period of time, and determining the start and end time of the user stay comprises a merge algorithm that merges two or more adjacent user stays if the two or more user stays are within a threshold of time, and the two or more user stays are within a threshold of distance of proximity of each other.

21. A mobile device, comprising:
a location sensor operative to persistently sense location information of the mobile device, wherein the location information includes a plurality of components, and wherein the location information includes a stream of location points;
a transceiver operative to establish a communication link with a network server; and
a controller, wherein the controller is operative to:
determine the mobile device is within a specific distance of a specific location for at least a specific minimum time duration based on the location information, wherein the specific distance has a non-zero value;
determine a start time of a user stay based on the location information, the specific location and the specific distance, comprising determining that a physical distance between a plurality of N successive location points during the at least the specific minimum time duration is less than a threshold, wherein N is a predetermined number of location points; and
determine an end time of the user stay based on the location information, the specific location and the specific distance, wherein the user stay is detected by clustering user location data continuously collected by the mobile device of the user, and matching the clustered user location data with a nearby point of interest.

22. The device of claim 21, wherein the controller is further operative to estimate a centroid of the user stay based on at least the start time and the end time of the user stay.

* * * * *